(12) United States Patent
Kreppold et al.

(10) Patent No.: US 8,253,960 B2
(45) Date of Patent: Aug. 28, 2012

(54) METHOD FOR THE OPERATION OF A DATA BUS, AND DATA BUS SYSTEM

(75) Inventors: Thomas Kreppold, Goldach (DE); Arno Best, Lohof (DE); Herbert Gibisch, München (DE); Robert Heimbach, München (DE); Hermann Andresen, Heldensstein (DE)

(73) Assignee: Océ Printing Systems GmbH, Poing (DE)

( * ) Notice: Subject to any disclaimer, the term of this patent is extended or adjusted under 35 U.S.C. 154(b) by 979 days.

(21) Appl. No.: 12/298,244

(22) PCT Filed: Apr. 24, 2007

(86) PCT No.: PCT/EP2007/053981
§ 371 (c)(1),
(2), (4) Date: Oct. 23, 2008

(87) PCT Pub. No.: WO2007/122229
PCT Pub. Date: Nov. 1, 2007

(65) Prior Publication Data
US 2009/0185215 A1    Jul. 23, 2009

(30) Foreign Application Priority Data

Apr. 24, 2006  (DE) .......................... 10 2006 018 871

(51) Int. Cl.
*G06F 3/12*    (2006.01)
*G06F 3/00*    (2006.01)

(52) U.S. Cl. ................ 358/1.15; 710/9; 710/15; 710/19

(58) Field of Classification Search ................ 358/1.15; 710/9, 15, 19, 104, 305
See application file for complete search history.

(56) References Cited

U.S. PATENT DOCUMENTS
5,502,438 A    3/1996  Blevin et al.
(Continued)

FOREIGN PATENT DOCUMENTS
DE    197 13 240 A1    10/1998
(Continued)

OTHER PUBLICATIONS

CAN-Controller Area Network, Grundlagen und Praxis, 2 Auflage 1997 ISBN 3-7785-2575-1.
(Continued)

*Primary Examiner* — King Poon
*Assistant Examiner* — Allen H Nguyen
(74) *Attorney, Agent, or Firm* — Schiff Hardin LLP

(57) ABSTRACT

In a method or system for operation of a data bus to which multiple bus participants each with a respective serial number specific to them are connected, a new bus participant is connected to the data bus. A request bus message is generated by the new bus participant, the message containing a preliminary participant identification number as an identifier derived from a serial number of the new bus participant. The request bus message is sent to a master processor system for assigning a final participant identification number for the new bus participant after a receipt of the request bus message with the preliminary participant identification number. The final participant identification number has fewer digits than the serial number of the new bus participant. The final participant identification number is used by the new bus participant as an identifier for further bus messages. Upon connection of said new bus participant, a time offset for said request bus message from said new bus participant to said master processor system is determined in addition to the preliminary participant identification number, said time offset being derived from the serial number of said new bus participant so that a simultaneous transmission of request bus messages from said new bus participant and any other new bus participants to said master processor system with the same preliminary participant identification numbers is avoided.

12 Claims, 4 Drawing Sheets

U.S. PATENT DOCUMENTS

| | | | |
|---|---|---|---|
| 6,216,172 B1 | 4/2001 | Kölblin et al. | |
| 6,839,789 B2 * | 1/2005 | Kramer et al. | 710/305 |
| 2004/0019720 A1 * | 1/2004 | Trembley | 710/110 |
| 2004/0098634 A1 * | 5/2004 | Zerbe et al. | 713/500 |
| 2005/0268002 A1 * | 12/2005 | Gregory et al. | 710/15 |
| 2008/0136444 A1 | 6/2008 | Fahrbach et al. | |

FOREIGN PATENT DOCUMENTS

| | | |
|---|---|---|
| DE | 299 07 265 U1 | 10/1999 |
| EP | 0 493 905 A1 | 7/1992 |
| WO | WO 94/07318 | 3/1994 |
| WO | WO 02/056545 A2 | 7/2002 |
| WO | WO 2004/062219 A1 | 7/2004 |

OTHER PUBLICATIONS

Etschberger, Konrad, Identifier zuordnen und Nachrichten austauschen, 1 Auflage 1998.

Zeltwanger, Holger, Jeder darf Senden und alle Empfangen, CAN-Kommunikation und Bus-Arbitrierung, 1 Auflage 1998.

* cited by examiner

| SE | ZV | VTI |
|---|---|---|
| 0 | 0 | 1 |
| 1 | 0 | 2 |
| 125 | 0 | 126 |
| 126 | 1 | 1 |
| 251 | 1 | 126 |
| 252 | 2 | 1 |
| 377 | 2 | 126 |
| 378 | 3 | 1 |
| 503 | 3 | 126 |
| 504 | 4 | 1 |
| ..... | ..... | ..... |
|  |  |  |
| 999997 | 7936 | 62 |
| 999998 | 7936 | 63 |
| 999999 | 7936 | 64 |

METHOD FOR THE OPERATION OF A DATA BUS, AND DATA BUS SYSTEM

BACKGROUND

The preferred embodiment concerns a method for operation of a data bus and a data bus system, in particular to control apparatuses to which multiple bus participants are connected with a respective serial number specific to them, for example printers, in particular electrophotographic high-capacity printers.

A typical data bus to control apparatuses is the CAN bus. Individual bus participants (that are electrical modules or assemblies) of an apparatus (for example a printing device) are connected with one another with the CAN bus. The CAN bus is a simple, cost-effective, serial data bus with which data can in fact be transferred very simply, however with a relatively low transfer rate in the environment of microprocessors. According to the CAN protocol, to transfer the data, the data can be distributed in multiple frames, wherein each frame is comprised of a data block and an identifier.

The CAN bus or the corresponding protocol is explained in detail in "CAN—Controller Area Network, Grundlagen und Praxis", 2nd Edition, 1997 (ISBN 3-7785-2575-1). A CAN bus is typically realized with a differential two-wire conductor. A CAN data frame can comprise a start bit, an identifier comprising 11 bits, an additional 7 control bits, 0 to 8 data bytes and additional control bits that follow the data bytes. The structure of a CAN data frame can differ depending on the specification. There is a CAN specification 2.0A and a CAN specification 2.0B.

The arbitration is executed per-bit and without a controller. This means that the sender (which prevails in the data bus relative to other senders based on its priority) does not need to re-send its frame. The control bits provided by the data bits are used for arbitration, wherein the arbitration essentially occurs via the bits of the identifier. It proceeds from Etschberger, Konrad, "Identifier zuordnen und Nachrichten austauschen", (ISBN 3-8259-1902-1), 1st edition, 1998, PRAXIS Profiline—Controller Area Network (CAN), pages 40 through 43, that the type of the identifier assignment can be designated as the basic structural element of CAN-based systems, since the identifier defines a CAN message, its relative priority and thus its latency period. Moreover, the scheme of the association of identifiers with CAN messages ultimately determines the communication structure of the network.

An apparatus-oriented assignment scheme for identifiers which enables a data exchange between a superordinate control apparatus (master) with up to 127 slave apparatuses is provided in CANopen with what is known as a "minimal apparatus configuration". The maximum number of participants in such a CANopen network is 128. This participator number is limited by the 11-bit identifier.

The difference between the data frames with standard frames that have the 11-bit identifier and with the extended frames that have the 29-bit identifier is explained in detail in Zeltwanger, Holger, "Jeder darf Senden und alle Empfangen; CAN-Kommunikation und Bus-Arbitrierung", (ISBN 3-8251-1902-1), 1st Edition, 1998, Praxis Profiline—Controller Area Network (CAN), pages 5-7.

A device for a line termination of 2-wire conductors, in particular for a CAN bus system, arises from WO 2004/062219. This device has a first and second termination resistors between the two wires of the data conductor, wherein the first and second termination resistors are connected in series. Switches that are activated by a control logic are provided between the two termination resistors. The control logic is connected with a microcontroller, such that the control logic can activate the switches arranged between the termination resistors after receiving a corresponding signal from the microcontroller. The configuration of the termination resistor can thus be changed at any time. Alternatively, an adaptation of the termination resistor can be provided in hardware by means of a bridge in the cable harness plug.

A branch device for a data bus (for example a CAN bus) arises from WO 02/056545 A2. With this branching device, individual branches can be decoupled or coupled in a star-shaped bus topology. This is possible during the operation of the data bus. This branching device has an interface transducer, a transmission and reception unit and one or more termination resistors.

Methods for automatic address assignment in data bus systems with multiple bus participants arise from DE-U1-299 07 265 and DE-C2-197 13 240.

A local network with a master and multiple slaves in which the network addresses are automatically allocated after the connection of a new slave is described in EP 0 493 905 A1. A preliminary network address is hereby calculated using the serial number of the respective slave. This calculation occurs at the slave. The master determines the preliminary network addresses of the slaves and assigns each slave a new network address that is shorter than the preliminary network address. In the event that a conflict should exist between two preliminary network addresses, this conflict is resolved using the serial numbers of the corresponding slaves.

An arrangement to connect processor systems by means of a data bus arises from WO 94/07318. The signal lines of the data bus require a termination resistor. The processor systems respectively have an input plug and an output plug so that they can be connected in series with another processor system by means of a cable. Termination resistors for the signal lines are provided at each processor system. They are connected by a switching device that is electrically connected with a contact in the output plug. This contact of the output plug is connected via a conductor of the connection cable with a corresponding contact of an input plug of a following processor system. In the following processor system, a predetermined voltage (in particular ground) is applied at the corresponding contact. This is detected by the switching device to switch the termination resistors of the preceding processor system. The last processor system of the processor systems connected in series has no connection to an additional processor system at the input plug. The contact of the corresponding input plug that is connected with the switching element is correspondingly not connected with the predetermined voltage potential. The switching element hereby connects the termination resistors to the corresponding signal lines, whereby these are terminated.

Apparatuses (for example high-capacity printers) have a modular design. It should thus be possible to add or remove individual modules or assemblies as simply as possible. These modules and assemblies should also be thus coupled to or decoupled from the data bus.

SUMMARY

It is an object to achieve a method for operation of a data bus as well as a data bus system that allows a coupling or, respectively, decoupling of bus participants to or from the data bus in a simple manner.

In a method or system for operation of a data bus to which multiple bus participants each with a respective serial number specific to them are connected, a new bus participant is connected to the data bus. A request bus message is generated by the new bus participant, the message containing a preliminary participant identification number as an identifier derived from a serial number of the new bus participant. The request bus message is sent to a master processor system for assigning a final participant identification number for the new bus participant after a receipt of the request bus message with the preliminary participant identification number. The final participant identification number has fewer digits than the serial number of the new bus participant. The final participant identification number is used by the new bus participant as an identifier for further bus messages. Upon connection of said new bus participant, a time offset for said request bus message from said new bus participant to said master processor system is determined in addition to the preliminary participant identification number, said time offset being derived from the serial number of said new bus participant so that a simultaneous transmission of request bus messages from said new bus participant and any other new bus participants to said master processor system with the same preliminary participant identification numbers is avoided.

DESCRIPTION OF THE PREFERRED EMBODIMENTS

Figure 1:
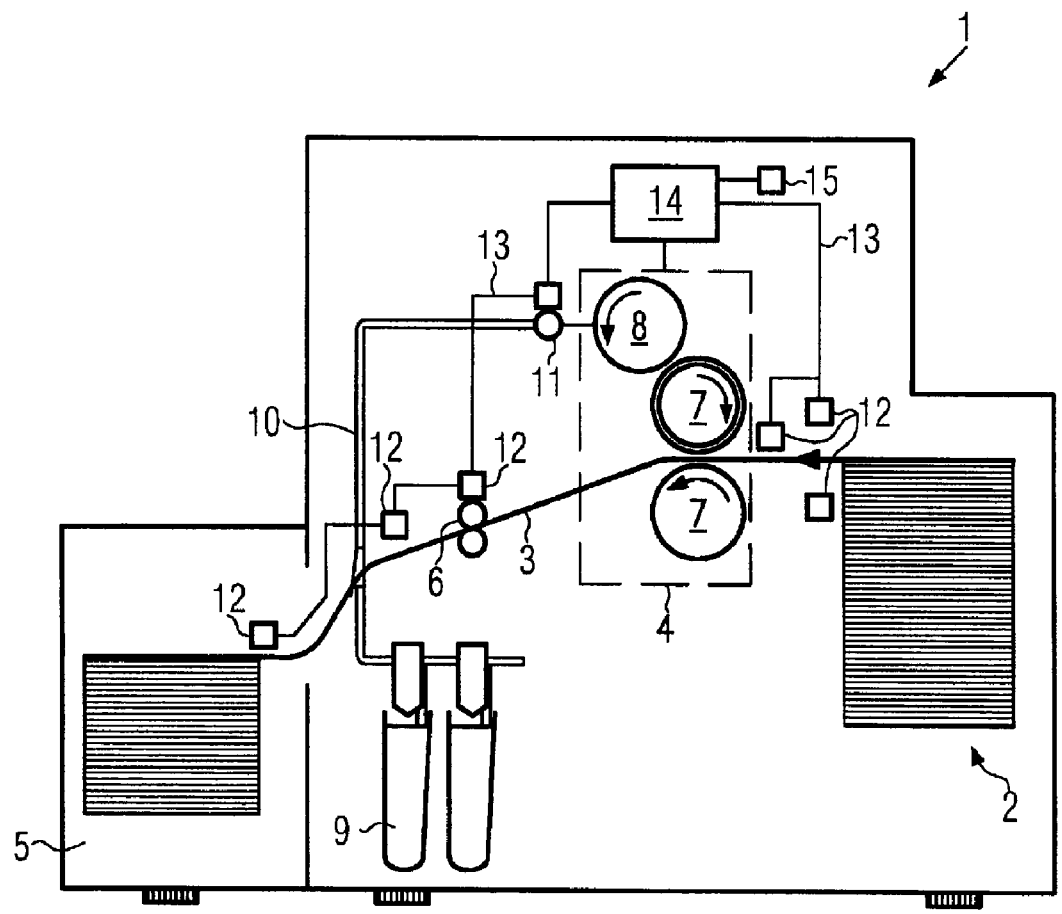
FIG. 1 shows schematically a printing device with a data bus and multiple bus participants.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

With the method according to the preferred embodiment for the operation of a data bus (in particular for the control of apparatuses) to which multiple bus participants (for example printers) with a respective serial number specific to them are connected, comprises the following steps:

connection of a new bus participant to the data bus, generation of a request bus message by the new bus participant, which message contains a preliminary participant identification number as an identifier, which number is derived from the serial number of the bus participant, wherein the request bus message is arbitrated in the data bus by means of the identifier;

assignment of a final participant identification number for the new bus participant after the receipt of the request bus message with the preliminary participant identification number, wherein the final participant identification number has fewer digits than the serial number; and use of the final participant identification number by the new bus participant as an identifier for further bus messages.

Since, according to the preferred embodiment, a preliminary participant identification number for the new bus participant is derived from its serial number, it is possible to link the bus participant to the data bus in advance and to assign to it a final participant identification number.

The final participant identification number is shorter than the serial number so that a compact format of bus messages can be used. If the data bus is a CAN bus, the final participant identification number is advantageously a number comprising 11 bits so that the compact bus messages or frames can be used according to CAN specification 2.0A, wherein the participant identification number is inserted into the bus messages as an identifier.

A time offset for the request bus message is determined in addition to the preliminary participant identification number. This is appropriate when the preliminary participant identification number is not unique, in order to ensure that no second application bus messages with identical participant identification numbers are simultaneously transferred via the data bus.

This method is particularly suitable for application in a data bus system in which one of the bus participants is a master processor system and the other bus participants are slave processor systems. In principle, the slave processor systems are hereby arbitrarily interchangeable insofar as they possess different serial elements. The control logic is connected with two control terminals of the output plug, such that it closes the corresponding switching element in the event that these two terminals of the output plug are shorted. The input plug of this bus participant has a bridge at the terminals corresponding to the two control terminals of the output plug, which bridge shorts these two terminals such that a control logic of an additional bus participant connected with the input plug via a cable is activated to open the switching element by means of the bridge.

Given the data bus system according to the preferred embodiment, the termination resistor is respectively connected between the data lines at the bus participant arranged at the end of the data bus and is thus active. In the bus participants that are not arranged at the end of the data bus, the switching element connected in series with the termination resistor is open so that here the termination resistors are not active. It is hereby ensured that the data bus is correctly electrically terminated.

A linear topology can be arbitrarily extended with this data bus system since the bus participants arranged within the topology are controlled via the bridge of the next bus participant arranged in the direction of the end of the data bus such that the switching element connected in series with the respective termination resistor is open.

The method according to the preferred embodiment and the data bus system according to the preferred embodiment are advantageously used in a CAN bus and in particular in an electrophotographic high-capacity printer.

A data bus to control apparatuses (in particular electrophotographic high-capacity printers) is operated with the method according to the preferred embodiment. Multiple bus participants are connected with one another with the data bus. These bus participants are modules or assemblies of the printing device that respectively have a processor system or a microcontroller.

For example, such a printing device is a single sheet printer 1 (FIG. 1) that has a paper input stack 2 with a device (not shown) to isolate the paper sheets (not shown). The paper sheets are conveyed along a transport path 3 from the paper input stack 2 to a printing group 4 and an output stack 5.

The transport path is formed by a plurality of roller pairs 6 (for simplification of the representation, only a single pair is shown in FIG. 1) and corresponding guide devices. The printing group 4 has two print rollers 7 and an inking roller 8. Given print rollers operating electrophotographically, the inking roller 8 is exposed by means of an exposure unit (not shown) so that it takes up ink particles at the exposed/unexposed parts. The ink particles are supplied from a corresponding reservoir 9 to the inking roller 8 via a feed line 10 and an adjustable valve 11.

The printer 1 has a control system that has multiple processor systems 12 to control the assemblies of the printing device. In the present preferred embodiment, assemblies are any part of the printing device that is controlled by a microcontroller or a processor system. Such assemblies are, for example, provided at the paper input stack 2, the transport path 3, the printing group 4, the output stack 5 etc. The processors systems 12 are connected with one another and with a central control device 14 via a data bus 13. A central storage medium 15 (designed as a fixed disk, for example) is coupled to the central control device 14.

Figures 2, 3:
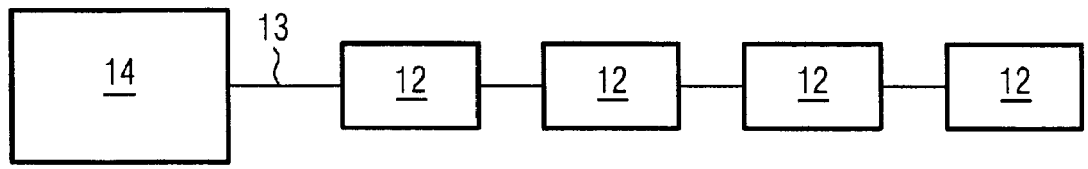
FIG. 2 shows schematically in simplified fashion a data bus system according to the preferred embodiment, with a master processor system and multiple slave processor systems.
FIG. 3 illustrates a table that contains the serial numbers, time offsets and the preliminary participant identification numbers of individual bus participants.

A typical structure of the data bus 13 is schematically shown in FIG. 2.

The data bus 13 connects the central control device 14 (which is a master processor system) with multiple microcontrollers or slave processor systems 12.

The master processor system 14 controls the data bus, meaning that it provides the clock rate with which the signals are transferred on the data bus 13. The master processor system 14 is thus distinguished from the slave processor systems 12.

The data bus 13 is advantageously designed as a CAN bus, which has already been explained in detail above.

A unique serial number is respectively assigned to the slave processor systems 12, meaning that it is ensured that no two slave processor systems that have the same serial number are provided in a bus system. The serial number is stored in a non-volatile memory (for example an EEPROM) at the slave processor systems.

In a first exemplary embodiment of the preferred embodiment, CAN data frames according to the CAN specification 2.0A—i.e. data frames with an identifier with 11 bits—are used as bus messages.

After connecting a new bus participant 12 to the data bus 13, the following method steps are executed in series:

1) The new bus participant 12 sends a notification bus message via the data bus 13. The notification bus message contains as an identifier a specific number, 127 in the present exemplary embodiment. Using this notification number in the identifier, the master processor system recognizes that a new bus participant (i.e. a new slave processor system) is connected to the data bus.
2) The master processor system hereupon sends a start bus message. This start bus message is directed to at least all newly connected bus participants. In the present exemplary embodiment, the start bus participant is directed to all slave processor systems (broadcast mode), and a participant identification number is associated with all slave processor systems with the following steps.
3) At this start bus message, the slave processor systems send an request bus message. These request bus messages respectively contain a preliminary participant identification number as an identifier, and the request bus messages are sent with a partial time offset so that there are no collisions with the same preliminary participant identification numbers in the data bus. The calculation of the preliminary participant identification numbers and of the time offset is explained in detail below.
4) After receipt of the request bus messages, the master processor system assigns final participant identification numbers and transmits them to the respective bus participants with a registration bus message. The registration bus messages still contain the preliminary participant identification numbers as identifiers. Both the serial numbers of the respective bus participant and its final participant identification number are contained in the data block of the registration bus messages.
5) The bus participants receive the registration bus messages. They are allocated using the preliminary participant identification numbers. Since the preliminary participant identification numbers do not need to be unique, the bus participants read the serial numbers contained in the registration bus message and determine, using a comparison with their own serial numbers, whether the respective registration bus message is provided for them. In the event that this is the case, they adopt the final participant identification number contained therein and store it as their participant identification number for the further communication via the data bus.

The preliminary participant identification number VTI is calculated from the serial number SE according to the following formula:

$$VTI = (SE \bmod 126) + 1$$

The serial number is mapped to a numerical range from [1; 126] with this modulo function. In the present exemplary embodiment, the number "0" cannot be used as a VTI since the identifier=0 is already assigned for the data bus system. Furthermore, the number "127" cannot be used as a preliminary participant identification number since (as already explained above) this is required as an identifier for the notification messages.

Since the preliminary participant identification numbers are not always unique, a time offset is calculated with which they respond to the start bus message of the master processor system. The time offset ZV is calculated using the serial number SE according to the following formula:

$$ZV = (SE \operatorname{div} 126) * DZ$$

wherein DZ is a difference time. This difference time DZ is the time that the maximum number of bus participants that have different preliminary participant identification numbers, multiplied with the time that is required for the transfer of a bus message. In the present exemplary embodiment, the maximum number of bus participants with different preliminary participant identification numbers is 126. If fewer than the maximum (in principle) possible number of bus participants with different preliminary participant identification numbers are provided at the data bus, the number of the bus participants can be reduced to the number of the maximum connectable bus participants. The maximum number of the bus participants connected to an apparatus via a CAN bus is normally 5 to 50. This means that normally this number determines the difference time and therefore the time offset.

If the request bus message comprises 100 bits and the transfer rate is 500 KB/s, the transmission time for an application bus message is 0.2 ms. If the maximum number of bus participants 5 connectable to an apparatus is 5, the difference time DZ results as 1 ms.

If the serial numbers are 6-digit decimal numbers, the number of possible time offsets or time windows is 999,999 divided by 126, which yields 7,936. This number of possible time windows multiplied with the difference time (here 7,936 ms) is used as a timeout time.

A timeout counter with the timeout time is started at the master processor system upon transmission of the start bus message. After expiration of the timeout time, it is checked whether a valid participant identification number has been assigned to all bus participants. If this is not the case, the allocation process is started again with the transmission of a start bus message.

In the formula specified above for calculation of the time offset ZV, the operator "div" means a division without remainder. In the present exemplary embodiment, the divisor is 126 since the number of possible preliminary participant identification numbers is 126. If this number should change, a correspondingly adapted divisor must be used.

FIG. 3 shows a table with three columns. The serial numbers SE are listed in the left column, the time offsets ZV in the unit of the difference time in the middle column and the preliminary participant identification numbers VTI in the right column. Using this table it can be recognized that the serial numbers 0 through 125 are mapped to the preliminary participant identification numbers VTI 1 through 126, the serial numbers 126 through 251 are mapped to the preliminary participant identification numbers VTI 1 through 126, and the serial numbers 252 through 377 are in turn mapped to the preliminary participant identification numbers 1 through 126. Different serial numbers are thus mapped to the same preliminary participant identification numbers since their numerical range is limited. The time offsets ZV are therefore determined.

Figure 4:
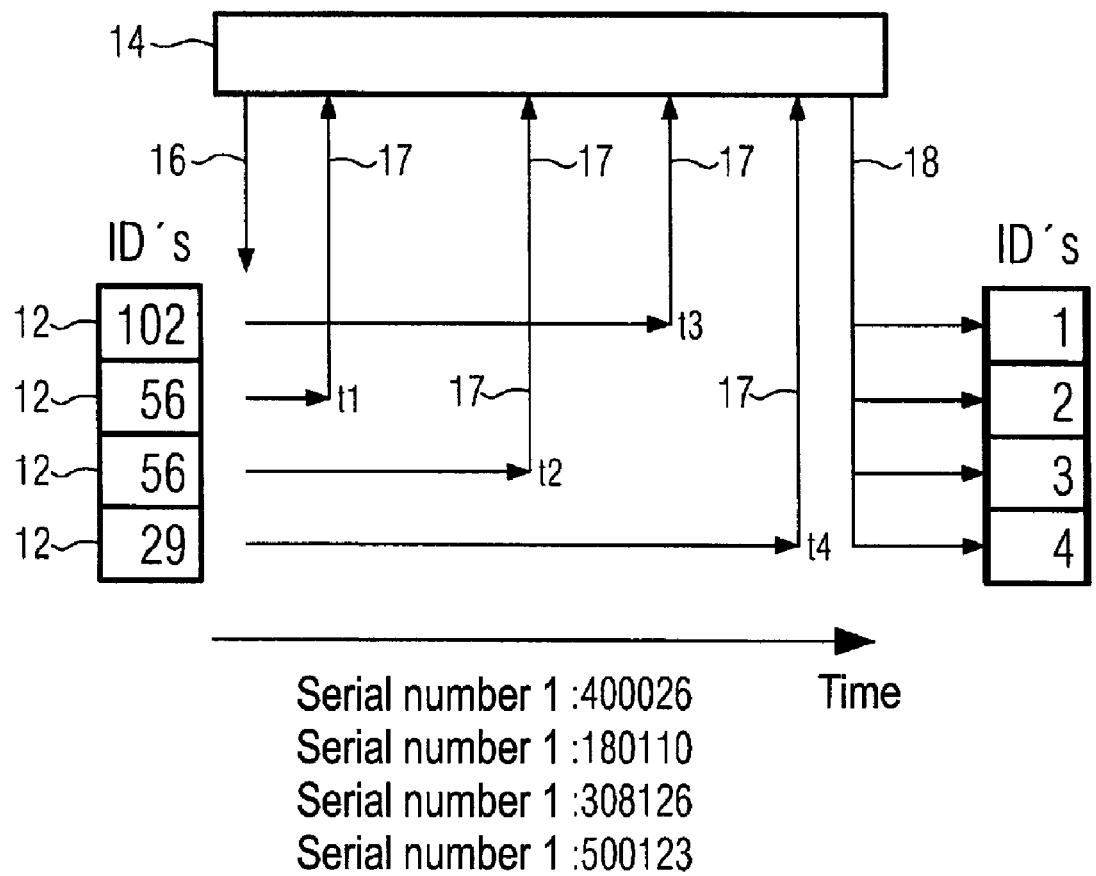
FIG. 4 shows schematically in a diagram the time-offset transfer of request bus messages.

An example with four slave microprocessor systems 12 that have the serial numbers 400026, 180110, 308126 and 500123 is presented in FIG. 4. These serial numbers yield as preliminary participant identification numbers VTI the values 102, 56, 56 and 29. As of the start bus message 16, the bus participants 12 (or the slave process systems) send their request bus messages 17, wherein these are transferred via the data bus with the calculated time offset relative to the start bus message. The master processor system 14 receives the individual registration bus messages and assigns the final participant identification numbers. The assignment of the final participant identification numbers can occur arbitrarily. It is only significant that each final participant identification number is assigned only once. The final participant identification numbers are then transmitted to the individual bus participants by means of the registration bus messages 18.

With the method explained above, the serial numbers can be mapped to smaller preliminary participant identification numbers that are suitable as identifiers for the registration process. In connection with the time offset, it is ensured that the request bus messages 17 are correctly arbitrated in the data bus using the identifiers, and no communication problems occur.

A second exemplary embodiment of the method according to the preferred embodiment (among many other possible embodiments) is subsequently explained.

In this method, after connecting a new bus participant an initialization is started in which the data bus is fully started. All slave processor system are restarted upon initialization. For example, this is executed in that their power supply is briefly disconnected and then reconnected. The master processor system hereby remains unchanged in operation.

During the initialization, bus messages are used with an identifier in which the complete serial number can be entered. These bus messages correspond to the data frames of the CAN specification 2.0B with a 29-bit identifier. Each bus participant sends a corresponding request bus message with which it requests the assignment of a final participant identification number.

Each bus participant counts the arriving request bus messages that are arbitrated in the data bus using the identifier. When a bus participant establishes that its request bus message is transferred via the data bus, it adopts as a final participant identification number the number that describes the position in the order of the transferred application bus messages. This means that the final participant identification numbers are the numbers in the order with which the respective request bus messages are transferred in the data bus.

The initialization of the data bus is concluded when all bus participants have a unique participant identification number. The further data transfer then occurs with bus messages that have a shorter identifier in which the final participant identification numbers are entered. For example, these bus messages correspond with the data frames of the CAN specification 2.0A with an 11-bit identifier.

By changing from bus messages with a long identifier to bus messages with a short identifier, the data quantity to be transferred per bus message is reduced, whereby the throughput of usable data is increased. Since data buses for controlling apparatuses that connect multiple modules or assemblies are designed to be relatively simple in terms of technology, they normally do not have a high data throughput. Therefore it is very advantageous when the data quantity to be transferred can be kept optimally small, as is possible with the two methods described above.

Figure 5:
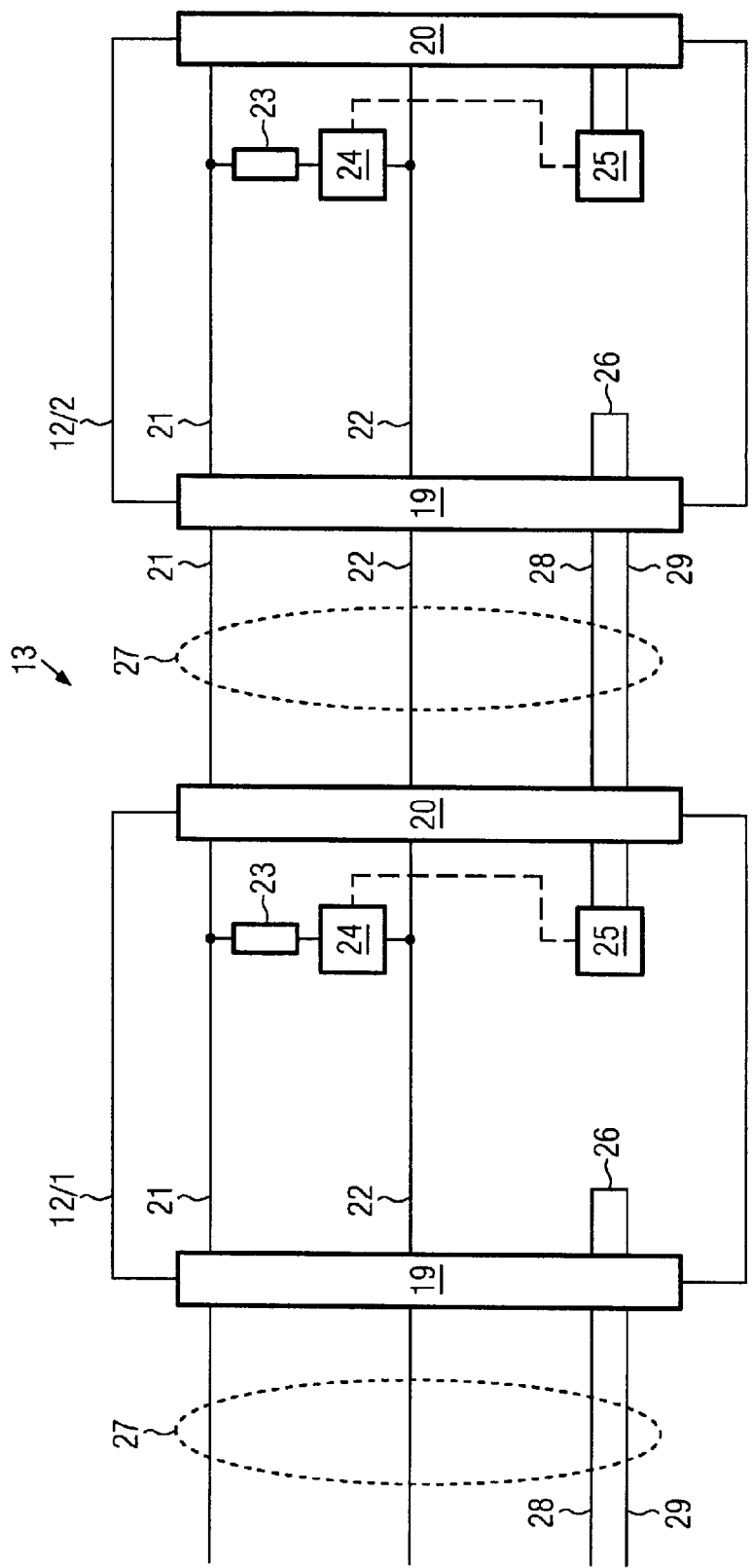
FIG. 5 shows schematically the design of a data bus system with linear topology according to the preferred embodiment.

FIG. 5 schematically shows a section of a bus system according to the preferred embodiment with linear topology. Two bus participants 12/1 and 12/2 are shown here, wherein the bus participants 12/2 forms the end of the data bus 13. These two bus participants respectively have an input plug 19 and an output plug 20. The data bus 13 comprises two signal lines 21, 22 for the differential data transfer with an H signal and an L signal, as is typical given a CAN bus, for example. A termination resistor 23 that is connected in series with a switching element 24 is arranged between the signal lines 21, 22 at the bus participants 12. For example, the switching element 24 is designed as a relay. This series circuit made up of termination resistor 23 and switching element 24 connects the two signal lines 21, 22. If the switching element 24 is closed, the two signal lines 21, 22 are connected via the termination resistor 23 that terminates the bus system to avoid reflections due to open line ends.

The switching element 24 is connected with a control logic 25 that controls said switching element 24. The control logic is connected with two control terminals of the output plug 20 such that it closes the switching element 24 when the control terminals of the output plug 20 are shorted.

At the two terminals corresponding to the control terminals of the output plug 20, the input plug 19 has a bridge 26 that shorts the two terminals.

Two bus participants 12 are connected with a bus cable 27 that have both signal lines 21, 22 and two control lines 28, 29. The control lines 28, 29 connect the control terminals of the output plug with the terminals of the bridge at the input plug, such that the control terminals are shorted via the bridge 26. The control logic 25 is hereby activated such that it opens the switching element 24, whereby the corresponding termination resistor 23 between the signal lines 21, 22 is deactivated.

The bus participant 12—in FIG. 5 it is the bus participant 12/2—at the end of the data bus is not connected with any other bus participant via its output plug 20. Therefore the control terminals are not shorted, whereby the control logic 25 activates the switching element 24 such that it is closed.

The termination resistor 23 is thus actively connected between the two signal lines 21, 22 and the data bus is properly terminated.

The data bus system according to the preferred embodiment can be arbitrarily extended or, respectively, shortened—without special technical knowledge—by additional bus participants that are respectively connected to the output plug of the previous last bus participant by means of a bus cable. Only the termination resistor in the bus participant arranged at the end of the data bus is active. Upon addition or removal of bus participants, the termination resistor does not need to be actively switched. It is also not necessary that the termination resistor as it is known from the prior art is turned on or off by a special microprocessor controller. The data bus system according to the preferred embodiment is extremely simple in design and ensures absolute safety with regard to a correct termination of the data bus upon coupling or decoupling bus participants.

If the bridge for shorting the control terminals were arranged in a bus cable, in particular in the plug connector to be plugged into the output plug, the disadvantage would exist that, when a bus cable is plugged into the output plug of the bus participant arranged at the end, its termination resistor is deactivated. The data bus would not thus be terminated, which can lead to an unwanted malfunction. For the preferred embodiment it is therefore essential that the bridge is arranged at the bus participant.

The method according to the preferred embodiment for operation of a data bus can be realized as software modules that are stored and executable distributed on the individual bus participants (master processor systems and slave processor systems).

The method according to the preferred embodiment and the data bus system according to the preferred embodiment are particularly designed for application in a printer, in particular a high-capacity printer since high-capacity printers are apparatuses that are modular in design and are configured with different modules and assemblies depending on the requirements of the user. With the method according to the preferred embodiment and the data bus system according to the preferred embodiment, the individual modules and assemblies can be exchanged without any adjustments having to be made with regard to the data bus.

The preferred embodiment can be briefly summarized as follows.

The preferred embodiment concerns a method for operation of a data bus and a data bus system.

With the method according to the preferred embodiment, upon connection of new bus participants, preliminary participant identification numbers are determined using the serial numbers of the respective bus participants; these preliminary participant identification numbers are used as identifiers for bus messages with which the assignment of final participant identification numbers is executed. The final participant identification numbers are shorter than the serial numbers, which is why it is possible in the final operation to use bus messages with correspondingly short identifiers.

The data bus system according to the preferred embodiment is designed such that the data bus is automatically terminated with the correct wave resistor solely via the connection of a new bus participant with a bus cable to said existing data bus.

Both the method according to the preferred embodiment and the data bus system according to the preferred embodiment facilitate the coupling or uncoupling of bus participants.

Although preferred exemplary embodiments have been displayed and described in detail in the drawings and in the preceding specification, these should be viewed as purely exemplary and not as limiting the invention. It is noted that the preferred exemplary embodiments are shown and described, and all variations and modifications that presently and in the future lie within the protective scope of the invention should be protected.

We claim as our invention:

1. A method for operation of a data bus to which multiple bus participants each with a respective serial number specific to them are connected, comprising the steps of:
    connecting a new bus participant to the data bus;
    generating a request bus message by the new bus participant, said message containing a preliminary participant identification number as an identifier, said number being derived from a serial number of the new bus participant, the request bus message being sent to a master processor system for assigning a final participant identification number for the new bus participant after receipt of the request bus message with the preliminary participant identification number, the final participant identification number having fewer digits than the serial number of the new bus participant;
    using the final participant identification number by the new bus participant as an identifier for further bus messages from said new bus participant; and
    upon connection of said new bus participant, a time offset for said request bus message from said new bus participant to said master processor system is determined in addition to the preliminary participant identification number, said time offset being derived from the serial number of said new bus participant so that a simultaneous transmission of request bus messages from said new bus participant and any other new bus participants to said master processor system with the same preliminary participant identification numbers is avoided.

2. A method according to claim 1 wherein the time offset is calculated via division without remainder of the serial number by a maximum number of preliminary participant identification numbers, multiplied with a time interval, wherein the time interval is dimensioned such that a number of application bus messages corresponding to the maximum number of bus participants can be transferred within said time interval.

3. A method according to claim 1 wherein the preliminary participant identification number is determined from the serial number via modulo with the maximum number of preliminary participant identification numbers.

4. A method according to claim 1 wherein one of the bus participants is said master processor system which is controlling the data bus, the other bus participants are slave processor systems, and the master processor system determines the final participant identification numbers.

5. A method according to claim 4 wherein:
    after connection of a new bus participant, a notification bus message is sent out with a special identifier, said identifier indicating that a new bus participant has been connected;
    the master processor system sending out a start bus message to which at least all newly connected bus participants respond with the request bus message; and
    after receiving the request bus message, the master processor system transmits to at least all newly connected bus participants a registration bus message with which the final participant identification number is determined.

6. A method according to claim 5 wherein the request bus message contains the serial numbers of the newly connected bus participants, and the registration bus message contains as an identifier the preliminary participant identification number, wherein the serial numbers and the final participant identification numbers are transmitted with the registration bus message, wherein the newly connected bus participant establishes, using the serial number transmitted with the registration bus message, whether the registration bus message is intended for it.

7. A data bus system, comprising:
- data lines and multiple bus participants connected with the data lines, said bus participants being respectively represented by a microprocessor system;
- the bus participants respectively having input plug and an output plug such that the respective bus participant can be connected to an existing data bus by means of the input plug, and an extension of the data bus can be connected to an additional bus participant at the output plug;
- the bus participants respectively having a termination resistor to terminate the data lines;
- the termination resistors being respectively connected in series with a switching element connected with a control logic to activate said switching elements;
- the control logic being connected with two control terminals of the output plug such that the control logic opens the corresponding switching element in the event that these two terminals of the output plug are shorted;
- the input plug of the bus participant having a bridge at the terminals corresponding to the two control terminals of the output plug which, at the last bus participant, then leads to a situation that its control lines remain open at the plug and the control logic can close the switching element which thus terminates the bus in a region of the last bus participant; and
- the bus participants being provided with software modules on computer-readable media to perform, connecting a new bus participant to the data bus, the steps of
- generating a request bus message by the new bus participant, said message containing a preliminary participant identification number as an identifier, said number being derived from a serial number of the new bus participant, the request bus message being sent to a master processor system for assigning a final participant identification number for the new bus participant after receipt of the request bus message with the preliminary participant identification number, the final participant identification number having fewer digits than the serial number of the new bus participant,
- using the final participant identification number by the new bus participant as an identifier for further bus messages from said new bus participant; and
- upon connection of said new bus participant, a time offset for said request bus message from said new bus participant to said master processor system is determined in addition to the preliminary participant identification number, said time offset being derived from the serial number of said new bus participant so that a simultaneous transmission of request bus messages from said new bus participant and any other new bus participants to said master processor system with the same preliminary participant identification numbers is avoided.

8. A data bus system according to claim 7 wherein the switching elements comprises a relay.

9. A data bus system according to claim 7 wherein the data lines are designed as differential signal lines.

10. A data bus system according to claim 7 wherein the data bus is designed as a CAN bus.

11. A software module for a data bus, comprising:
a non-transitory computer-readable medium comprising a computer program for operation of a data bus to which multiple bus participants each with a respective serial number specific to them are connected, said computer program performing the steps of:
- connecting a new bus participant to the data bus;
- generating a request bus message by the new bus participant, said message containing a preliminary participant identification number as an identifier, said number being derived from a serial number of the new bus participant, the request bus message being sent to a master processor system for assigning a final participant identification number for the new bus participant after receipt of the request bus message with the preliminary participant identification number, the final participant identification number having fewer digits than the serial number of the new bus participant;
- using the final participant identification number by the new bus participant as an identifier for further bus messages from said new bus participant; and
- upon connection of said new bus participant, a time offset for said request bus message from said new bus participant to said master processor system is determined in addition to the preliminary participant identification number, said time offset being derived from the serial number of said new bus participant so that a simultaneous transmission of request bus messages from said new bus participant and any other new bus participants to said master processor system with the same preliminary participant identification numbers is avoided.

12. A printer, comprising:
multiple assemblies connected with one another with a data bus;
multiple bus participants each with a respective serial number specific to them connected to the data bus; and
means for operating the data bus according to the following steps:
- connecting a new bus participant to the data bus;
- generating a request bus message by the new bus participant, said message containing a preliminary participant identification number as an identifier, said number being derived from a serial number of the new bus participant, the request bus message being sent to a master processor system for assigning a final participant identification number for the new bus participant after receipt of the request bus message with the preliminary participant identification number, the final participant identification number having fewer digits than the serial number of the new bus participant;
- using the final participant identification number by the new bus participant as an identifier for further bus messages from said new bus participant; and
- upon connection of said new bus participant, a time offset for said request bus message from said new bus participant to said master processor system is determined in addition to the preliminary participant identification number, said time offset being derived from the serial number of said new bus participant so that a simultaneous transmission of request bus messages from said new bus participant and any other new bus participants to said master processor system with the same preliminary participant identification numbers is avoided.

* * * * *